No. 607,673. Patented July 19, 1898.
J. ARMSTRONG & W. HEYWOOD.
COMBINED FILTER AND COOLER.
(Application filed Jan. 20, 1897.)
(No Model.) 2 Sheets—Sheet 1.

WITNESSES
F. W. Wright
J. C. Connor

INVENTORS
James Armstrong
William Heywood
BY
Howson and Howson
THEIR ATTORNEYS

No. 607,673. Patented July 19, 1898.
J. ARMSTRONG & W. HEYWOOD.
COMBINED FILTER AND COOLER.
(Application filed Jan. 20, 1897.)

(No Model.) 2 Sheets—Sheet 2.

WITNESSES
F. W. Wright
A. C. Connor

INVENTORS
James Armstrong
William Heywood
BY
Howson and Howson
THEIR ATTORNEYS

UNITED STATES PATENT OFFICE.

JAMES ARMSTRONG AND WILLIAM HEYWOOD, OF MANCHESTER, ENGLAND.

COMBINED FILTER AND COOLER.

SPECIFICATION forming part of Letters Patent No. 607,673, dated July 19, 1898.

Application filed July 20, 1897. Serial No. 645,237. (No model.)

*To all whom it may concern:*

Be it known that we, JAMES ARMSTRONG and WILLIAM HEYWOOD, subjects of the Queen of Great Britain, residing, respectively, at Rusholme and West Gorton, both in Manchester, in the county of Lancaster, England, have invented new and useful Improvements in a Combined Filter and Cooler, of which the following is a specification.

Figure 1:
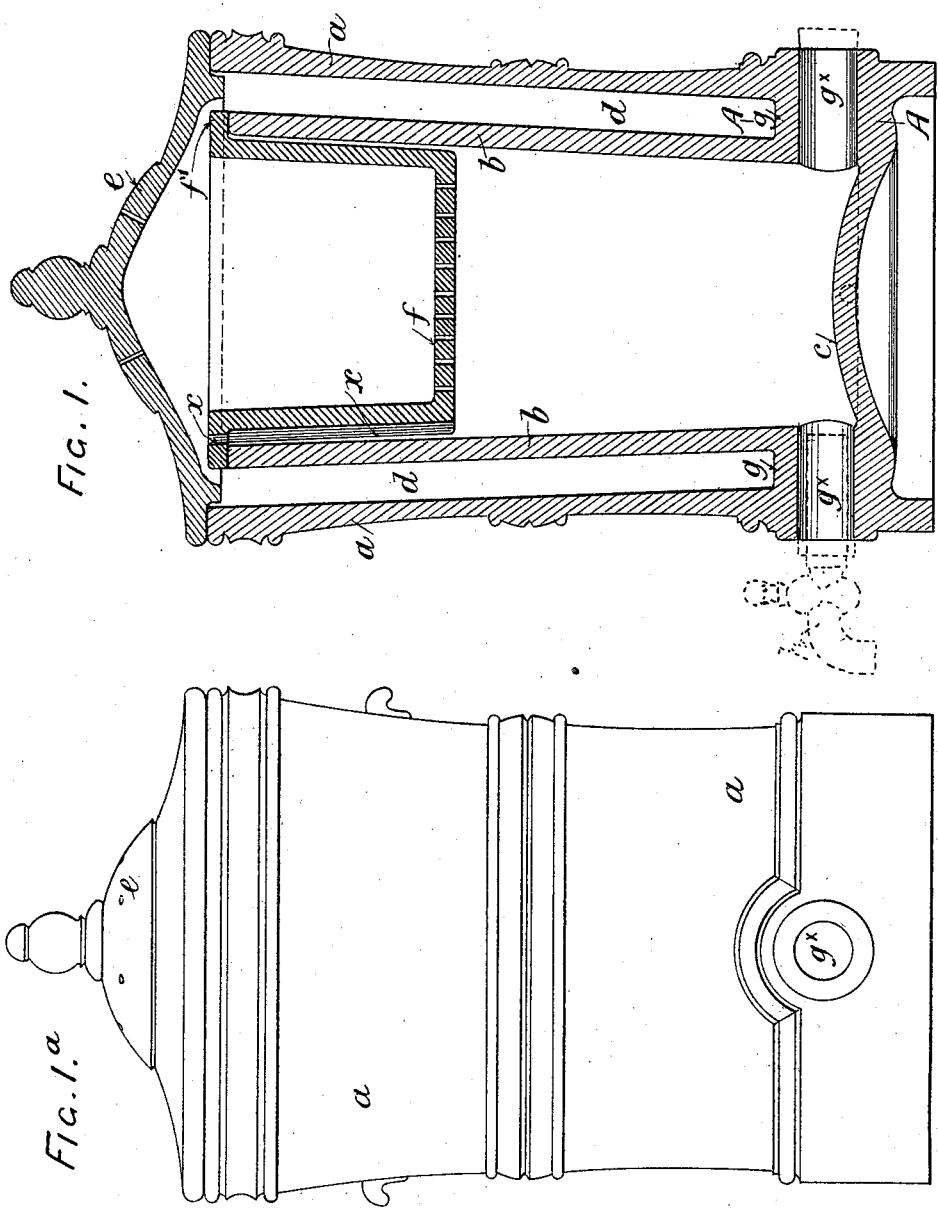
Figure 2:
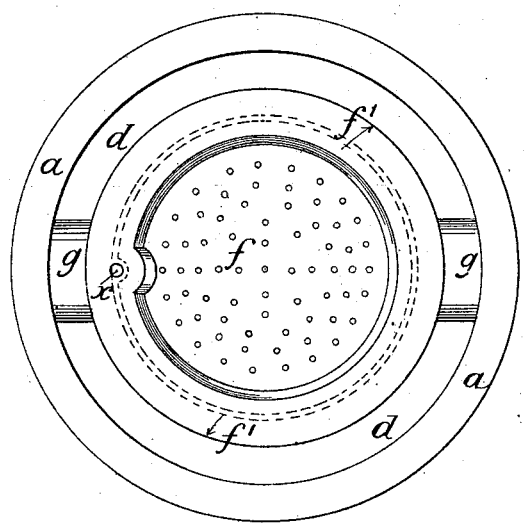
Figure 3:
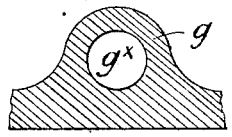

The object of this invention is to manufacture a combined filter and cooler (for water or other liquids) in earthenware of a form which shall be portable and also easy of manufacture and economical in cost; and in order that our invention may be clearly understood we have annexed hereto a sheet of drawings, referred to in the following description:

Figure 1 is a vertical section through a filter and cooler made according to our invention. Fig. 1$^a$ is an elevation thereof. Fig. 2 is a plan thereof with the cover removed, and Fig. 3 is a detached section taken at A A on Fig. 1.

For the purposes of our invention we make an earthenware vessel (see Figs. 1 and 2) in the form of two cylinders $a$ $b$, one, $b$, within the other, $a$, with a closed bottom $c$ and open at the top, the top of the inner cylinder $b$ being lower than that of the outer one $a$, as seen on Fig. 1, and leaving an annular space $d$ between the two. A cover $e$ is provided to inclose both the outer cylinder $a$ and the inner cylinder $b$, such cover being preferably made with air-holes. The inner walls of the inner cylinder are continuous from top to bottom—that is, their continuity is unbroken by flanges or ledges on which dirt would accumulate and which are difficult to keep clean. We provide a suitable receptacle $f$, having a perforated bottom and fitting in the inner cylinder $b$ and made with a flange $f'$, resting upon the upper edge of the cylinder $b$, to support the receptacle $f$, in which the filtering medium is placed. At the bottom of the annular space $d$ we have at one place, or at two opposite places, as seen on Fig. 1, a solid lump of earthenware $g$ $g$, joining the two cylinders, and through this lump we bore a hole $g^\times$ $g^\times$, (see also Fig. 3,) communicating from the outside with the inner cylinder or filter $b$, in one or both of which we fix (by means of a cork or otherwise) a tap $h$, by means of which the filtered water or other liquid can be drawn off, an air hole or passage $x$ being provided—say down one side of the receptacle $f$ (see Fig. 2)—to allow the contents of the vessel $b$ to be so withdrawn.

The annular space $d$ around the filter is filled with broken ice well pressed down together and forms a refrigerator to keep the filtered water or other liquid always cool.

If it is required to use the vessel for cooling milk, wine, or other liquid not required to be filtered, the filtering material and the receptacle $f$ may be removed, in which case the capacity of the inner vessel $b$ will be somewhat increased.

The vessel is intended to be placed on a convenient stand of such a height above a table or counter as to allow of a tumbler or other drinking vessel being placed beneath the tap or taps.

We claim as our invention—

The combination with a vessel in the form of two concentric chambers having continuous sides and a single bottom common to both, and a cylindrical space for receiving broken ice between the two, of a removable inner receptacle provided with a perforated bottom carrying the filtering medium and with a projecting flange at the top for supporting the same on the inner cylinder, and an air hole or passage between the two; means for drawing off the filtered water from the inner cylinder, and a single cover for inclosing the two concentric chambers.

In testimony whereof we have signed our names to this specification in the presence of two subscribing witnesses.

JAMES ARMSTRONG.
WILLIAM HEYWOOD.

Witnesses:
 GEORGE DAVIES,
 CHARLES A. DAVIES.